(12) United States Patent
Cho et al.

(10) Patent No.: US 8,898,352 B2
(45) Date of Patent: Nov. 25, 2014

(54) STORAGE DEVICE

(71) Applicant: Samsung Electronics Co., Ltd., Suwon-si (KR)

(72) Inventors: Youngjin Cho, Seoul (KR); Hyunsik Kim, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 13/716,752

(22) Filed: Dec. 17, 2012

(65) Prior Publication Data

US 2013/0227347 A1    Aug. 29, 2013

(30) Foreign Application Priority Data

Feb. 28, 2012  (KR) .................. 10-2012-0020325

(51) Int. Cl.
  G06F 3/00    (2006.01)
  G06F 13/28   (2006.01)
  G06F 11/10   (2006.01)

(52) U.S. Cl.
  CPC ............... G06F 13/28 (2013.01); G06F 11/10 (2013.01)
  USPC .................. 710/52; 710/19; 710/22

(58) Field of Classification Search
  CPC ................. G06F 11/10; G06F 13/28
  See application file for complete search history.

(56) References Cited

U.S. PATENT DOCUMENTS

| 2003/0079065 | A1 | 4/2003 | Barry et al. |
| 2010/0088463 | A1 | 4/2010 | Im et al. |
| 2013/0019051 | A1 * | 1/2013 | Somanache et al. .......... 711/103 |

FOREIGN PATENT DOCUMENTS

| JP | 200114266 A | 1/2001 |
| KR | 1020030072525 A | 9/2003 |
| KR | 1020070060854 A | 6/2007 |
| KR | 1020100037874 A | 4/2010 |

* cited by examiner

Primary Examiner — Zachary K Huson
(74) Attorney, Agent, or Firm — Sughrue Mion, PLLC

(57) ABSTRACT

A storage device is provided which includes a nonvolatile memory device and a controller configured to write meta information, indicating that a transfer of unit data is completed, in a buffer memory when the unit data is transferred to the buffer memory from the nonvolatile memory device.

19 Claims, 15 Drawing Sheets

| U | V | State |
|---|---|-------|
| 0 | 0 | Empty |
| 0 | 1 | Valid |
| 1 | 0 | Error Correcting |
| 1 | 1 | Uncorrectable |

| V | V | V | State |
|---|---|---|-------|
| 1 | 1 | 1 | Valid |
| 1 | 1 | 0 | Valid |
| 0 | 1 | 1 | Valid |
| 1 | 0 | 1 | Valid |
| 0 | 1 | 0 | Invalid |
| 0 | 0 | 1 | Invalid |
| 1 | 0 | 0 | Invalid |
| 0 | 0 | 0 | Invalid |

STORAGE DEVICE

CROSS-REFERENCE TO RELATED APPLICATIONS

This application claims priority from Korean Patent Application No. 10-2012-0020325 filed Feb. 28, 2012, in the Korean Intellectual Property Office, the entire contents of which are hereby incorporated by reference.

BACKGROUND

Apparatuses, devices, and articles of manufacture consistent with the present disclosure relate to a storage device, and more particularly, relate to a storage device using a nonvolatile memory device as a storage medium.

Semiconductor memory devices mainly used as a storage device may include volatile memories such as a dynamic random access memory (DRAM), a static RAM (SRRAM), and the like and nonvolatile memories such as an electrically erasable and programmable ROM (EEPROM), a ferroelectric RAM (FRAM), a phase-change RAM (PRAM), a magnetoresistive RAM (MRAM), a flash memory, and the like. The volatile memories may lose contents stored therein at power-off, while the nonvolatile memories may retain contents stored therein even at power-off.

In recent years, devices using a nonvolatile memory have increased. For exemplary, an MP3 player, a digital camera, a cellular phone, a camcorder, a flash card, and a solid state disk (SSD) may use a nonvolatile memory as a storage device. Among nonvolatile memories, a flash memory may support a function of electrically erasing cell data in a lump. This may enable the flash memory to be widely used as a storage device instead of a hard disk drive.

SUMMARY

According to an aspect of an exemplary embodiment, there is provided a storage device including a nonvolatile memory device and a controller configured to write meta information, indicating that a transfer of unit data is completed, in a buffer memory when the unit data is transferred to the buffer memory from the nonvolatile memory device.

After confirming that the unit data is stored in the buffer memory, the controller may start to transmit the unit data to a host.

The controller may check the meta information periodically.

The controller may write the meta information in the buffer memory in duplication.

The controller may exchange data with a host, and the unit data may have a size of a sector unit being a data exchange unit between the controller and the host.

When unit data of write-requested data transferred from a host is provided to the buffer memory, the controller may write information, indicating that the unit data of the write-requested data is received, in the buffer memory.

According to another aspect of another exemplary embodiment, there is provided a storage device which includes a nonvolatile memory device; a buffer memory configured to temporarily store data transferred from the nonvolatile memory device; and a nonvolatile memory direct memory access (DMA) configured to be in charge of data exchange between the nonvolatile memory device and the buffer memory. When unit data of data sent from the nonvolatile memory device is stored in the buffer memory, the nonvolatile memory DMA writes transfer completion information, indicating that the unit data is stored in the buffer memory, in a meta area of the buffer memory.

The storage device may further comprise a host DMA configured to be in charge of data exchange between the buffer memory and a host, the host DMA checking the transfer completion information recorded in the meta area of the buffer memory periodically.

The host DMA may confirm that at least one unit data is stored in the buffer memory, based on the transfer completion information recorded in the meta area, and then starts to send the at least one unit data stored in the buffer memory to the host.

The unit data may have a size of a sector unit being a data exchange unit between the host DMA and the host.

The host DMA may store write-requested data from the host at the buffer memory, and writes information, indicating that data of the sector unit is stored in the buffer memory, in the meta area whenever the write-requested data is stored in the buffer memory by the sector unit.

The storage device may further include a CPU configured to control an overall operation of the storage device. At a read operation or a write operation, an authority associated with data exchange may be provided to the host DMA and the nonvolatile memory DMA from the CPU.

The storage device may further include an error correction code (ECC) circuit configured to correct an error of data transferred to the buffer memory from the nonvolatile memory device. The nonvolatile memory DMA may write the transfer completion information in the meta area based on an error correction result of the ECC circuit.

The ECC circuit may perform an error correction operation by an error correction unit corresponding to an integer multiple of a size of the unit data, and the nonvolatile memory DMA writes the transfer completion information in the meta area whenever data corresponding to the error correction unit is stored in the buffer memory.

The nonvolatile memory DMA may write the transfer completion information in the meta area in duplication.

BRIEF DESCRIPTION OF THE DRAWINGS

The above and other aspects will become apparent from the following description with reference to the following figures, wherein like reference numerals refer to like parts throughout the various figures unless otherwise specified, and wherein.

DETAILED DESCRIPTION

Figure 1:
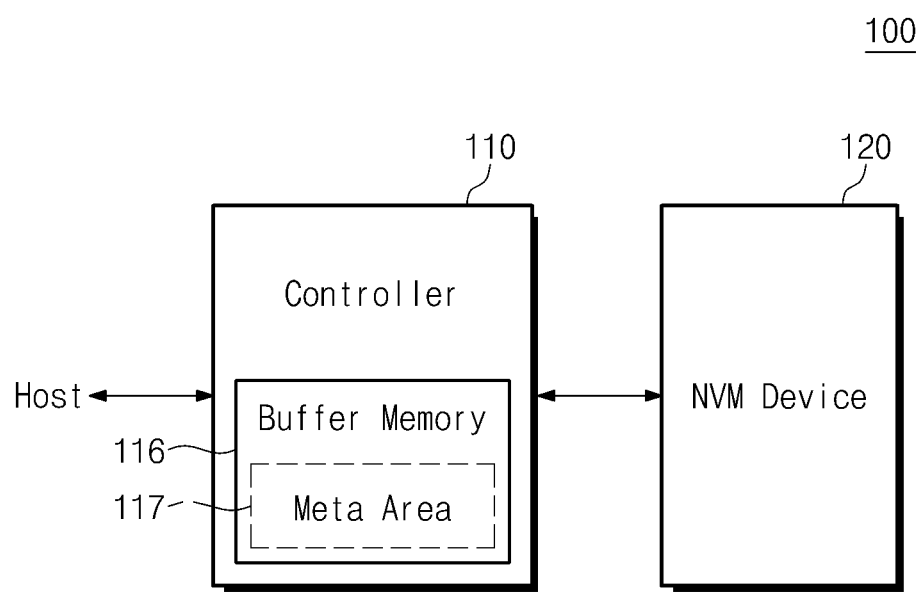
FIG. 1 is a block diagram schematically illustrating a storage device according to an exemplary embodiment.

Exemplary embodiments will be described in detail with reference to the accompanying drawings. The inventive concept, however, may be embodied in various different forms, and should not be construed as being limited only to the illustrated exemplary embodiments. Rather, these embodiments are provided as examples so that this disclosure will be thorough and complete, and will fully convey the inventive concept to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a storage device using a nonvolatile memory device may be exemplarily used as a memory system for describing the inventive concept. Further, the inventive concept may be described under the assumption that a unit of data to be transferred is a sector unit. However, the inventive concept is not limited thereto. Other merits and functions of the inventive concept may be understood from contents disclosed herein. Also, a flash memory being a nonvolatile memory may be used as a storage medium. Alternatively, nonvolatile memories such as MRAM, ReRAM, FRAM, PRAM, NOR flash memory, and the like, may be used as a storage medium, or a combination of heterogeneous memory devices may be used as a storage medium.

FIG. 1 is a block diagram schematically illustrating a storage device according to an exemplary embodiment. Referring to FIG. 1, a storage device 100 may include a controller 110 and a nonvolatile memory (NVM) device 120.

The controller 110 may exchange data with a host, and may transfer write-requested data of the host to the NVM device 120. The controller 110 may exchange data with the NVM device 120, and may provide the host with data read-requested by the host. The controller 110 may include a buffer memory 116. Some part of buffer memory 16 is allocated as a meta area 117.

The buffer memory 116 may temporarily store data transferred from the host before the data is sent to the NVM device 120. The buffer memory 116 may temporarily store data read from the NVM device 120 before the read data is sent to the host. The buffer memory 116 may be formed of a volatile memory such as DRAM, SRAM, or the like. However, the inventive concept is not limited thereto. For example, the buffer memory 116 may be formed of a nonvolatile memory such as a flash memory or the like.

A meta area 117 of the buffer memory 116 may be used to store information associated with whether a sector of sectors of read-requested data is transferred to the buffer memory 116 from the NVM device 120. That is, when a sector of sectors of read-requested data is transferred to the buffer memory 116 from the NVM device 120, the controller 110 may record information indicating that a sector transfer is completed, at the meta area 117. Thus, the controller 110 may check a sector stored in the buffer memory 116 by periodically checking information stored in the meta area 117. As illustrated in FIG. 1, the meta area 117 may be formed of a part of the buffer memory 116.

In exemplary embodiments, the buffer memory 116 may be configured to include the meta area 117. However, the inventive concept is not limited thereto. For example, it is well understood that the meta area 117 may be formed of a memory independent from the buffer memory 116.

The NVM device 120 may store data transferred from the host under the control of the controller 110. The NVM device 120 may send stored data to the host under the control of the controller 110. The NVM device 120 may use a NAND flash memory as a storage medium. For example, a storage medium of the nonvolatile memory device 120 may be formed of PRAM, ReRAM, FRAM, NOR flash memory, and the like.

It is assumed that a read operation on user data is requested by the host. If only one sector of sectors of the read-requested data is transferred to the buffer memory 116 from the NVM device 120, the controller 110 may record information indicating that the sector is transferred, in the meta area 117.

Thus, the controller 110 may check whether a transfer of sectors corresponding to the read-requested data is completed, by periodically checking information recorded in the meta area 117. Although one sector of sectors corresponding to the read-requested data is transferred to the buffer memory 116, the controller 110 may send the sector stored in the buffer memory 116 to the host.

In general, a data transfer to a host from the buffer memory 116 may commence when at least one page of data is temporarily stored in the buffer memory 116. However, the storage device according to an exemplary embodiment may perform a read operation rapidly by sending data to the host from the buffer memory 116 by a sector unit.

Figure 2:
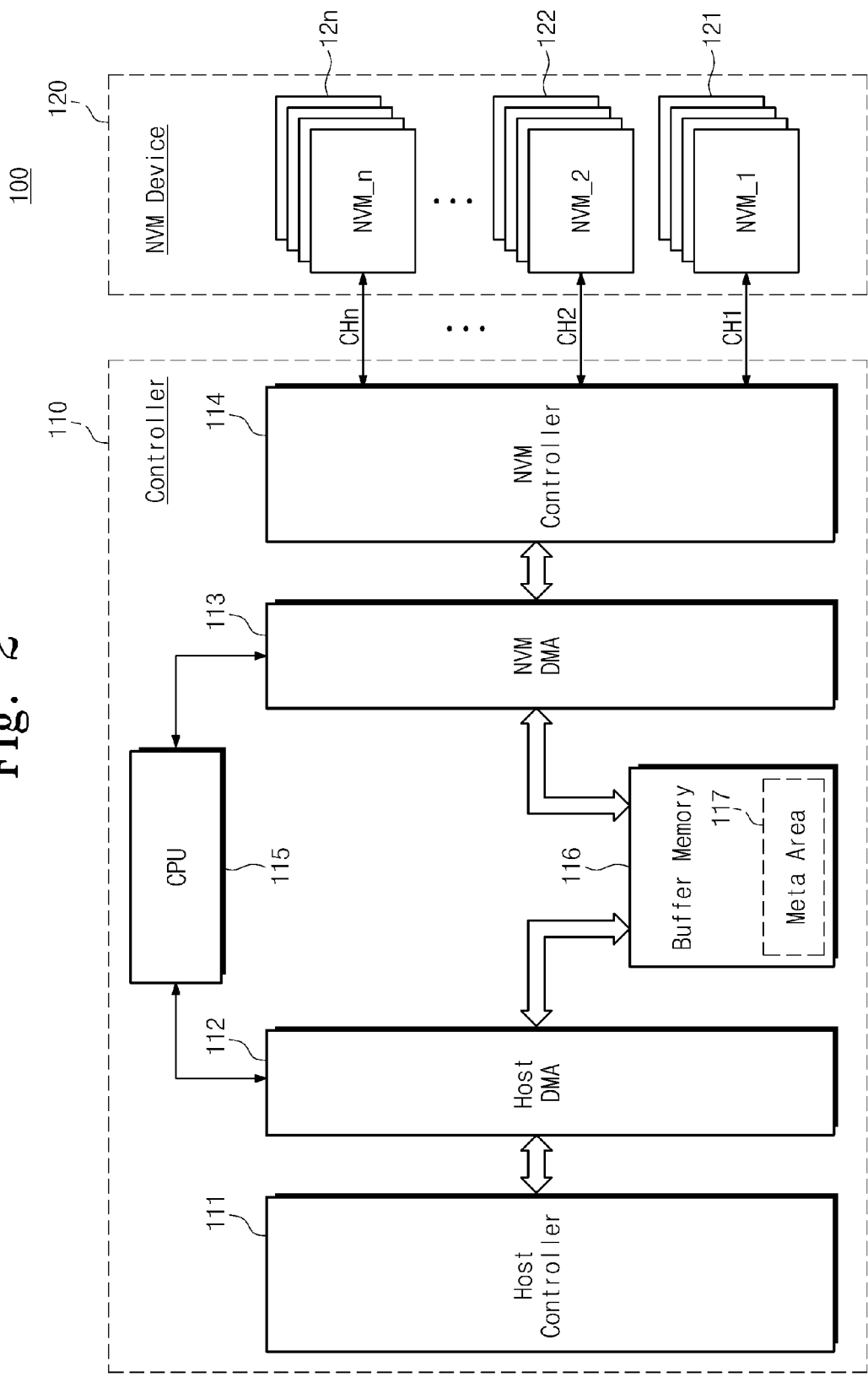
FIG. 2 is a more detailed block diagram of a storage device illustrated in FIG. 1.

FIG. 2 is a more detailed block diagram of a storage device illustrated in FIG. 1. Referring to FIG. 2, a storage device 100 may include a controller 110 and an NVM device 120. The controller 110 may include a host controller 111, a host direct memory access (hereinafter, referred to as a host DMA) 112, a nonvolatile memory direct memory access (hereinafter, referred to as an NVM DMA) 113, a nonvolatile memory (NVM) controller 114, a central processing unit (CPU) 115, and a buffer memory 116.

The host controller 111 may provide physical interconnection between a host and the storage device 100. That is, the host controller 111 may be configured to interface with the host according to a bus format of the host. The host format may include Universal Serial Bus (USB), PCI express, ATA, Parallel ATA (PATA), Serial ATA (SATA), or the like. When the ATA family (ATA, SATA, and PATA) is used as the bus format of the host, the host controller 111 may be configured to exchange data with the host by a sector unit. The sector unit may have a size of, for example, 512 bytes.

The host controller 111 may support a disk emulation function that enables the host to recognize the storage device 100 as a hard disk drive (HDD). For example, the host controller 111 may provide a function such as a flash translation layer (FTL) for hiding an erase operation.

The host DMA 112 may be in charge of a data transfer between the host controller 111 and the buffer memory 116. For example, at a read operation, the host DMA 112 may receive a request for a data transfer between the host controller 111 and the buffer memory 116 from the CPU 115. The host DMA 112 may access a meta area 117 periodically, and may check whether at least one sector corresponding to read-requested data is stored in the buffer memory 116. When at least one sector corresponding to read-requested data is stored in the buffer memory 116, the host DMA 112 may send the sector in the buffer memory 116 to the host via the host controller 111.

The NVM DMA 113 may be in charge of a data transfer between the buffer memory 116 and the NVM controller 114. For example, at a read operation, the NVM DMA 113 may transfer read-requested data stored in the NVM device 120 to the buffer memory 116. In this case, while the NVM DMA 113 transfers data read from the NVM device 120 to the buffer memory 116, the NVM DMA 113 may record information indicating that a sector is transferred to a buffer memory, in the meta area 117.

The NVM controller 114 may be in charge of an interface between the controller 110 and the NVM device 120. The nonvolatile memory controller 114 may be connected to the NVM device 120 via a plurality of channels CH1 to CHn, and may scatter data transferred from the host into nonvolatile memories NVM_1 121 to NVM_n 12n at a write operation. At a read operation, the nonvolatile memory controller 114 may receive data stored in the nonvolatile memories NVM_1 121 to NVM_n 12n via the channels CH1 to CHn to transfer the data to the buffer memory 116.

The CPU 115 may control an overall operation of the storage device 100. But, at a read operation, the CPU 115 may entrust the nonvolatile memory DMA 113 with a flow control associated with data exchange between the NVM device 120 and the buffer memory 116, and may entrust the host DMA 112 with a flow control associated with data exchange between the buffer memory 116 and the host. Excessive overhead on the CPU 115 may thus be eliminated.

The buffer memory 116 may temporarily store data transferred from the host or data read out from the NVM device 120. As described in FIG. 1, the buffer memory 116 may be formed of a volatile memory such as DRAM, SRAM, or the like or a nonvolatile memory such as a flash memory, PRAM, ReRAM, FRAM, or the like. A part of the buffer memory 116 may be assigned to a meta area 117.

The meta area 117 may temporarily store meta information related to data transferred to the buffer memory 116 from the NVM device 120. In particular, information indicating that a sector corresponding to read-requested data is stored in a buffer memory may be stored in the meta area 117. The buffer memory 116 and the meta area 117 will be more fully described with reference to FIG. 3.

The nonvolatile memory device 120 may include a plurality of nonvolatile memories NVM_1 121 to NVM_n 12n, which are connected to the controller 110 via the plurality of channels CH1 to CHn. The nonvolatile memories NVM_1 121 to NVM_n 12n may be formed of a flash memory, PRAM, ReRAM, FRAM, or a combination of heterogeneous nonvolatile memories.

In the event that a nonvolatile memory is formed of a flash memory, the flash memory may perform a read operation by a page unit or a super page unit. Herein, a page unit may have a size of, for example, 2 KB, 4 KB, and so on, and a supper page unit may have a size corresponding to, for example, a plurality of pages.

When a write operation on user data is requested from the host, the user data may be distributed and stored at the nonvolatile memories NVM_1 121 to NVM_n 12n via the plurality of channels CH1 to CHn. When a read operation on user data is requested from the host, the user data may be read from the nonvolatile memories NVM_1 121 to NVM_n 12n by a page unit or a supper page unit to be transferred to the buffer memory 116 via the plurality of channels CH1 to CHn.

In general, when at least one page of data is transferred to a buffer memory via each channel, a signal indicating that a transfer of page data is complete may be sent to the CPU 115. The CPU 115 may start to transfer the page data in the buffer memory to the host by a page unit. This process may shorten a time by gathering page data in the buffer memory and sending the gathered data to the host.

In particular, it is assumed that a time taken to transfer a sector to a buffer memory via each channel is about 1 μs and a time taken to transfer a signal (hereinafter, referred to as a call back (CB) signal) indicating completion of a data transfer to the host is 1 μs. If the call back signal is generated by a sector unit under the assumption, a time of 2 μs may be taken to transfer a call back signal on a sector to a CPU. In the event that a sector has a size of 512 KB and a page has a size of 4 KB, it may take a time of 16 μs for one page.

On the other hand, it may take a time of 9 μs to transfer a call back signal to the CPU after page data is gathered at the buffer memory. With the above description, a time may be reduced by gathering at least one page of data at the buffer memory and then transferring the gathered to the host by a page unit. However, the above-described manner may introduce a waiting time corresponding to a read latency until page data is collected at the buffer memory.

According to the exemplary embodiment, the storage device 100 may immediately transfer data sent to the buffer memory 116 to the host by a sector unit. Thus, a waiting time due to read latency may be minimized. Further, instead of the call back signal, the storage device 100 may record information indicating that a sector is transferred in the meta area 117. Thus, a delay time due to the call back signal may be avoided.

Figure 3:
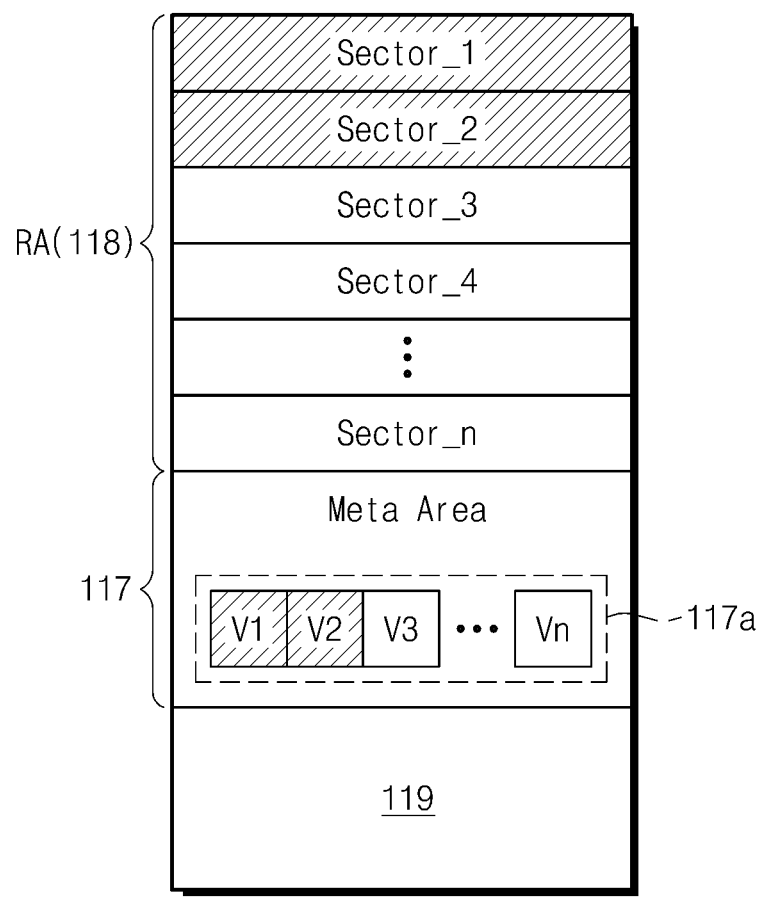
FIG. 3 is a diagram illustrating a buffer memory and a meta area in FIG. 2.

FIG. 3 is a diagram illustrating the buffer memory and the meta area in FIG. 2. Referring to FIG. 3, the buffer memory 116 may include a read area (RA) 118, the meta area 117, and a rest area 119.

Data transferred from an NVM device 120 may be temporarily stored in the read area (RA) 118 by a sector unit. In the meta area 117, there may be stored access and control information of a storage device 100. Information indicating whether a transfer of a sector stored in the read area 118 is completed may be stored at a transfer information area 117a of the meta area 117.

It is assumed that data of a first sector Sector_1 of read-requested data is transferred to the read area 118 from an NVM device 120 (refer to FIG. 2). In this case, an NVM DMA 113 (refer to FIG. 2) may mark a flag indicating that the first sector Sector_1 is transmitted, in the transfer information area 117a of the meta area 117. For example, in a case where V1 to Vn of the transfer information area 117a correspond to Sector_1 to Sector_n of the read area 118, respectively, the NVM DMA 113 may mark that a transfer of data of the first sector Sector_1 to the read area 118 is completed, by changing a value of V1 to '1' from '0'. However, this is only exemplary, and other values may indicate that a transfer of data has occurred.

A host DMA 112 (refer to FIG. 2) may access the transfer information area 117a of the meta area 117 periodically, and may immediately transmit sector data to a host when a value of the transfer information area 117a is '1'. Thus, the storage device 100 according to an exemplary embodiment may transmit data rapidly before data stored in the buffer memory 116 constitute a page unit.

The rest area 119 may include all areas except the read area 118 and the meta area 117. For example, the rest area 119 may include a write area that is used to temporarily store data to be transferred to the nonvolatile memory device 120 from the host.

Figure 4:
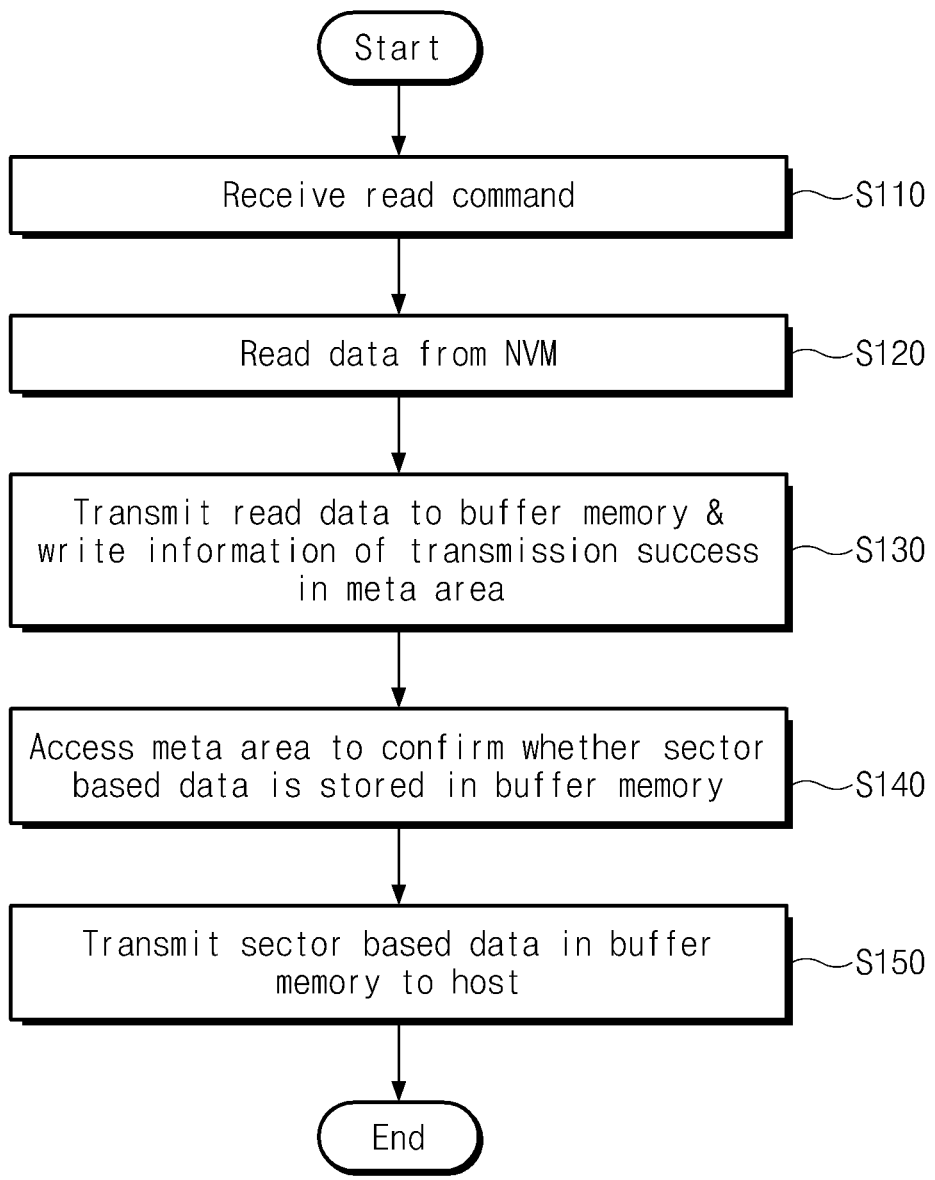
FIG. 4 is a flowchart illustrating an operation of a storage device according to an exemplary embodiment.

FIG. 4 is a flowchart illustrating an operation of a controller of a storage device according to an exemplary embodiment. Below, a read operation of a storage device 100 will be described with reference to accompanying drawings.

In operation S110, a read request for data stored in a NVM device 120 may be received from a host.

In operation S120, a read operation for data stored in the NVM device 120 may be performed under the control of a controller 110.

In operation S130, a NVM DMA 113 may transmit data read out from the NVM device 120 to a buffer memory 116. At the same time, the NVM DMA 113 may record information, indicating that data is transferred to the buffer memory 116, in a meta area 117 by a sector unit.

In operation S140, a host DMA 112 may access the meta area 117 to confirm whether data corresponding to at least one sector is stored in the buffer memory 116.

In operation S150, the host DMA 112 may transfer data stored in the buffer memory 116 to the host by a sector unit.

Figure 5:
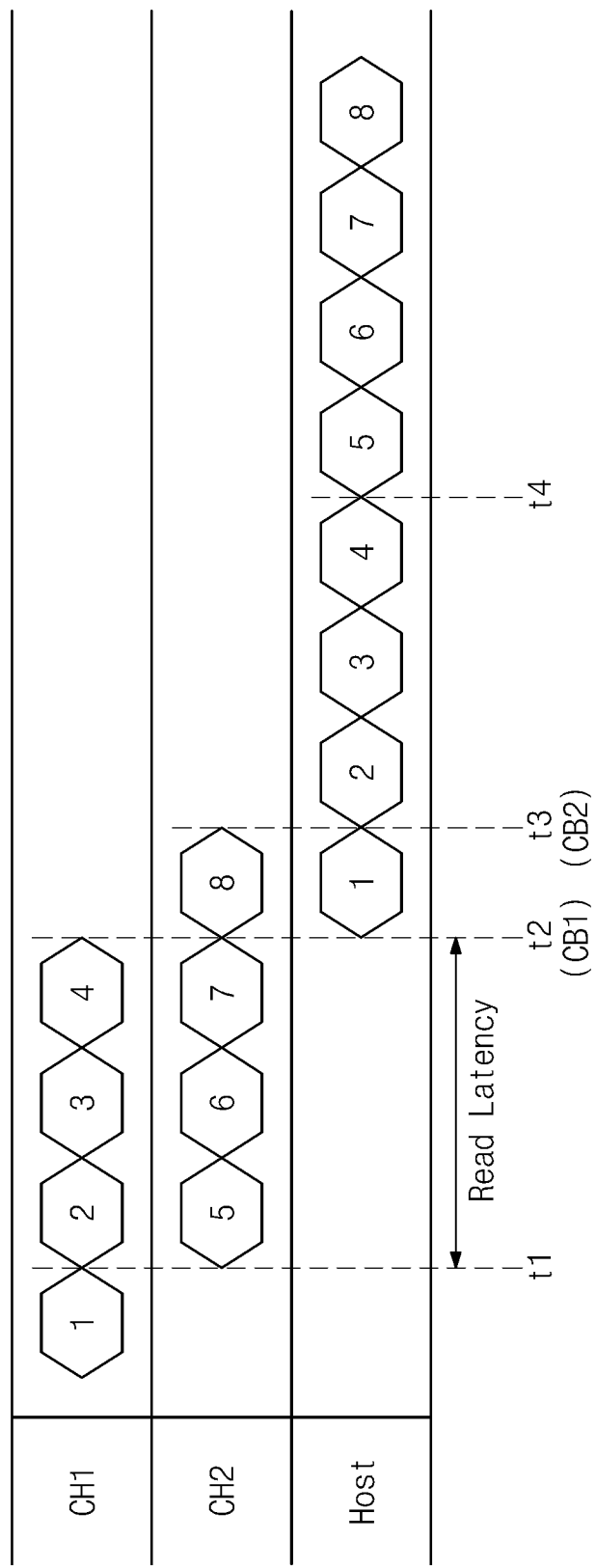
FIGS. 5 and 6 are diagrams describing how a read operation of a storage device according to an exemplary embodiment is improved.
Figure 6:
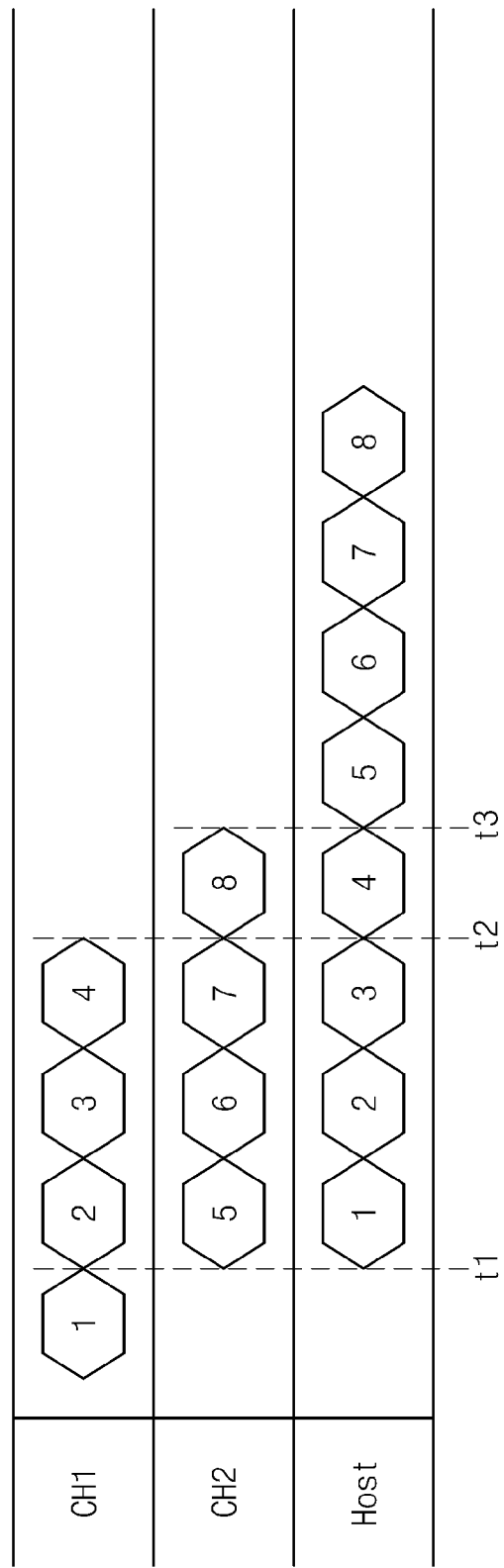

FIGS. 5 and 6 are diagrams describing how a read operation of a storage device according to an exemplary embodiment is improved. In FIG. 5, there is illustrated the case that data is transferred to a host from a buffer memory by a page unit. In FIG. 6, there is illustrated the case that data is transferred to a host from a buffer memory by a sector unit of a storage device 100 in FIG. 2.

For ease of description, it is assumed that read-requested data is formed of a first sector to an eighth sector and a page is formed of four sectors. Further, it is assumed that first to fourth sectors are sent to a buffer memory 160 from a NVM device 120 via a first channel CH1 and fifth to eighth sectors are sent to the buffer memory 160 from the NVM device 120 via a second channel CH2.

Referring to FIG. 5, data may be sent to a host from a buffer memory by a page unit. In this case, if a first sector to a fourth sector constituting a page are sent to a buffer memory by a time t2, a first call back signal CB1 may be generated. A CPU may start to send data of the first to fourth sectors stored in the buffer memory to the host in response to the first call back signal. At this time, there may be generated read latency from a point of time (t1) when a transfer of data of the first sector is completed to a point of time (t2) when a transfer of data of the first sector starts.

If a transfer on the fifth to eighth sectors constituting a page may be ended at a time t3, a second call back signal CB2 may be generated. The CPU may start to send the fifth to eighth sectors to the host at a time t4 when a transfer of the first to fourth sectors to the host is completed.

On the other hand, when one sector is transferred to a buffer memory, the storage device 100 in FIG. 2 may immediately send the sector to a host. Referring to FIG. 6, if data of a first sector is sent to a buffer memory 116 (refer to FIG. 2) by a time t1, a host DMA 112 (refer to FIG. 2) may recognize that a first sector is stored in the buffer memory 116, based on a meta area 117 (refer to FIG. 2). The host DMA 112 may start to send the first sector to the host immediately at the time t1. Thus, the storage device 100 according to an exemplary embodiment may avoid causing the read latency described in FIG. 5. As a result, the storage device 100 may minimize a time consumed due to the read latency that is caused according to a manner described in FIG. 5.

Figure 7:
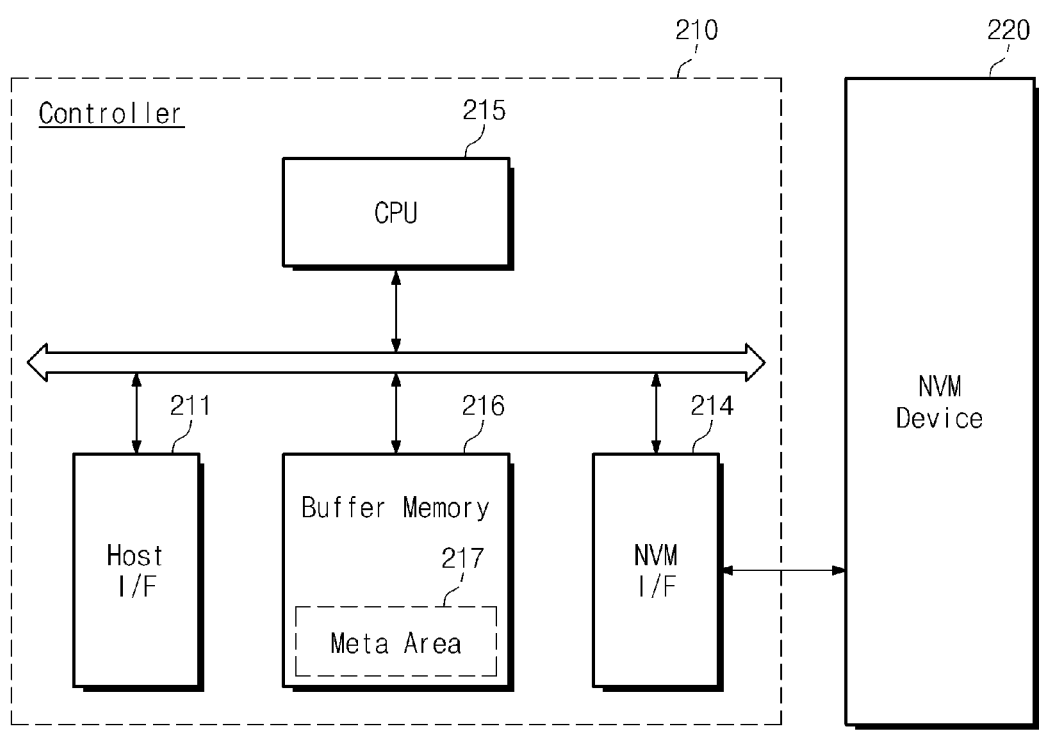
FIG. 7 is a block diagram schematically illustrating a storage device according to another exemplary embodiment.

FIG. 7 is a block diagram schematically illustrating a storage device according to another exemplary embodiment. In FIG. 7, elements that are similar to that in FIG. 2 are marked by similar reference numerals, and description thereof is thus omitted.

Referring to FIG. 7, a storage device 200 may include a controller 210 and a nonvolatile memory (NVM) device 220. The controller 210 may include a host interface (I/F) 211, a nonvolatile memory (NVM) interface (I/F) 214, a CPU 215, and a buffer memory 216. The buffer memory 216 may include a meta area 217.

Unlike a storage device 100 in FIG. 2, the storage device 200 in FIG. 7 may operate in a centralized manner. That is, in case of the storage device 100 in FIG. 2, a function of a CPU 115 (refer to FIG. 2) may be dispersed such that a host DMA 112 (refer to FIG. 2) and an NVM DMA 114 (refer to FIG. 2) are in charge of a data transfer at a read operation or a write operation. On the other hand, in case of the storage device 200 in FIG. 7, the CPU 215 may be in charge of a data transfer at a read operation or a write operation. Meanwhile, the host interface 211 and the NVM I/F 214 may provide interfaces with a host and the NVM device 200, respectively.

Figure 8:
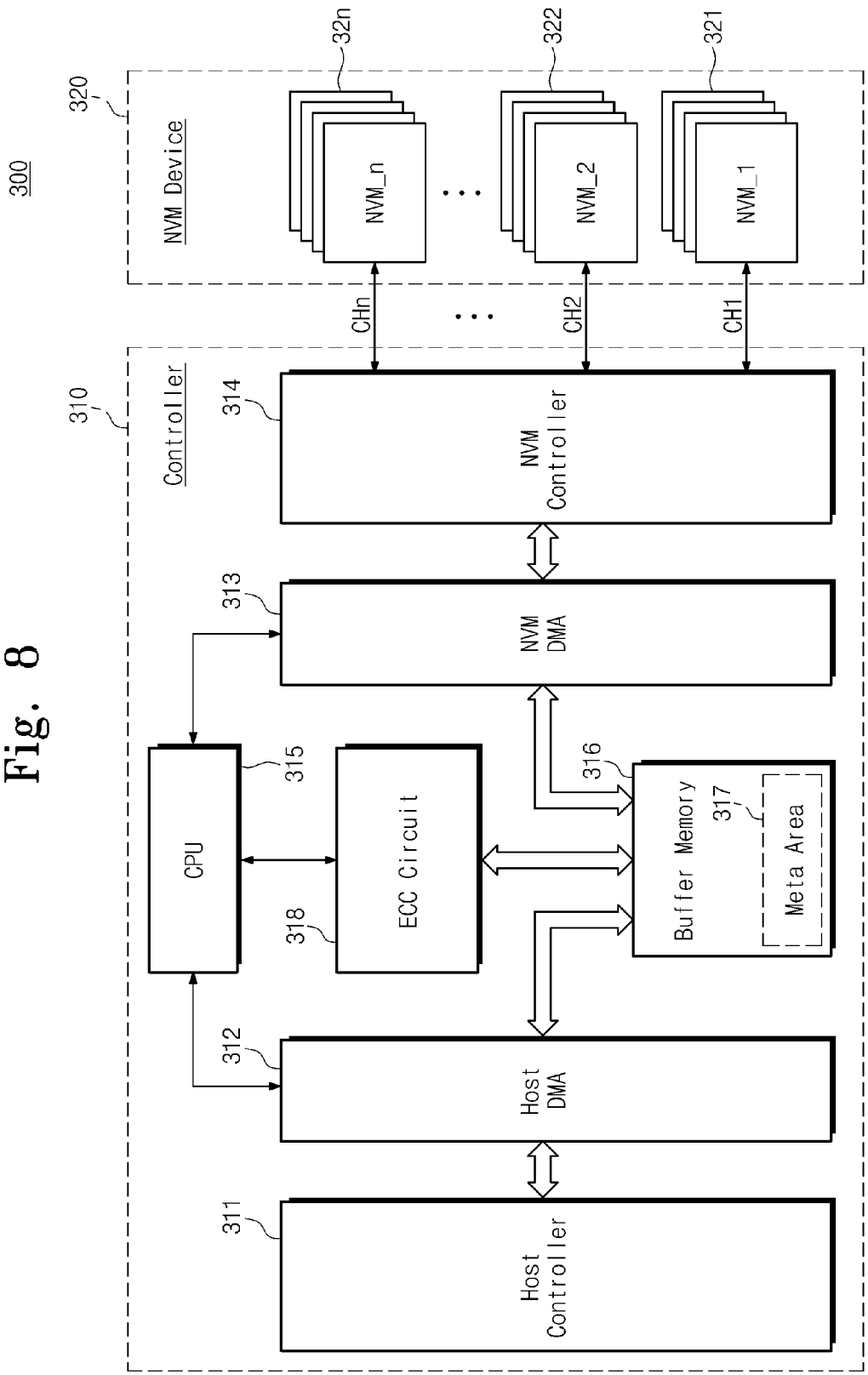
FIG. 8 is a block diagram schematically illustrating a storage device according to still another exemplary embodiment.

FIG. 8 is a block diagram schematically illustrating a storage device according to still another exemplary embodiment. In FIG. 8, elements that are similar to that in FIG. 2 are marked by similar reference numerals, and description thereof is thus omitted.

Referring to FIG. 8, a storage device 300 may provide an error correction function to secure integrity of data stored in a nonvolatile memory (NVM) device 320. The error correction function may be executed by an ECC circuit 318.

The ECC circuit 318 may generate an error correction code ECC for correcting erroneous bits of data received from the NVM device 320. The ECC circuit 318 may encode data to be provided to the NVM device 320 to generate data to which ECC information (or, parity information) is added. The ECC circuit may decode data output from the NVM device 320, and may determine whether decoding is performed successfully. The ECC circuit 318 may output a direction signal according to a determination result, and may correct erroneous bits of data using ECC information.

The ECC circuit 318 may correct errors using coded modulation such as low density parity check (LDPC) code, BCH code, turbo code, Reed-Solomon code, convolution code, recursive systematic code (RSC), trellis-coded modulation (TCM), Block coded modulation (BCM), and the like. The ECC circuit 318 may include a circuit, a system, or device for error correction or a combination thereof.

In the event that error correction is made with respect to data sent to a buffer memory 316 from the NVM device 320, a NVM DMA 313 may record a state of data at a meta area 317 according to a data transfer result and an error correction result. A write manner of the NVM DMA 313 according to an error correction result will be more fully described with reference to FIGS. 9 and 10.

Figures 9, 10:
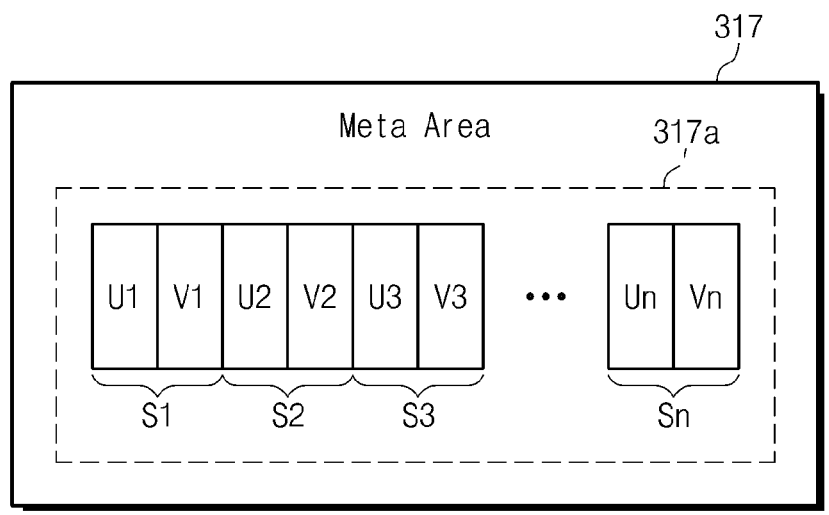
FIG. 9 is a diagram illustrating a meta area of the storage device in FIG. 8.
FIG. 10 is a diagram illustrating information recorded at the meta area in FIG. 9.

FIG. 9 is a diagram illustrating a meta area of a storage device with an error correction function as shown in FIG. 8. FIG. 10 is a diagram illustrating information recorded in a meta area in FIG. 9.

Referring to FIG. 9, the meta area 317 may include a transfer information area 317a in which information on each sector corresponding to read-requested data is recorded. Information associated with each sector may be formed of at least two bits, and indicate information associated with error correction and with whether a data transfer is completed.

In a case where a sector S is sent to a buffer memory 316 (refer to FIG. 8), a NVM DMA 313 (refer to FIG. 8) may write data at "U" and "V" of the transfer information area 317a according to a transfer result and an error correction result.

For example, when a first sector S1 is transferred to the buffer memory 316, the NVM DMA 313 may write data at "U1" and "V1" of the transfer information area 317a. Herein, "U" may indicate information associated with error correction, and "V" may indicate information associated with a data transfer.

For example, referring to FIG. 10, the case that "U" and "V" are "0" and "0" may denote a state that data is not yet written by the NVM DMA 313. That is, the case that "U" and "V" are "0" and "0" may denote a state that a sector is not transferred to the buffer memory 316. The case that "U" and "V" are "0" and "1" may denote a state that a data transfer of a sector is completed and the sector does not include erroneous bits or erroneous bits of the sector are corrected by an error correction operation. The case that "U" and "V" are "1" and "0" may denote a state that an error correction operation on the sector is being performed. The case that "U" and "V" are "1" and "1" may denote a state that a data transfer of a sector is completed and the sector is uncorrectable.

As described with reference to FIGS. 8 to 10, a storage device according to an exemplary embodiment may provide an error correction function for securing integrity of data stored in a nonvolatile memory device.

An error correction unit of the ECC circuit 318 may be different from a unit (i.e., a sector unit) by which data is transferred to a host. For example, the ECC circuit 318 may perform an error correction operation on two sectors by a unit. In this case, the NVM DMA 313 may write data at the transfer information area 317a according to an error correction unit. For example, in the event that the ECC circuit 318 performs an error correction operation on two sectors by a unit, the NVM DMA 313 may write a transfer result and an error correction result at the transfer information area 317a by a unit of two sectors, and a host DMA 312 may send data to a host by a unit of two sectors.

The error correction function may be performed with respect to data stored in a meta area of a buffer memory. For example, an error correction function of an ECC circuit may be provided to secure integrity of data stored in a transfer information area of a meta area.

In other exemplary embodiments, integrity of data stored in a meta area may be secured by a manner in which the same data is written in duplication. This manner will be more fully described with reference to FIGS. 11 and 12.

Figures 11, 12:
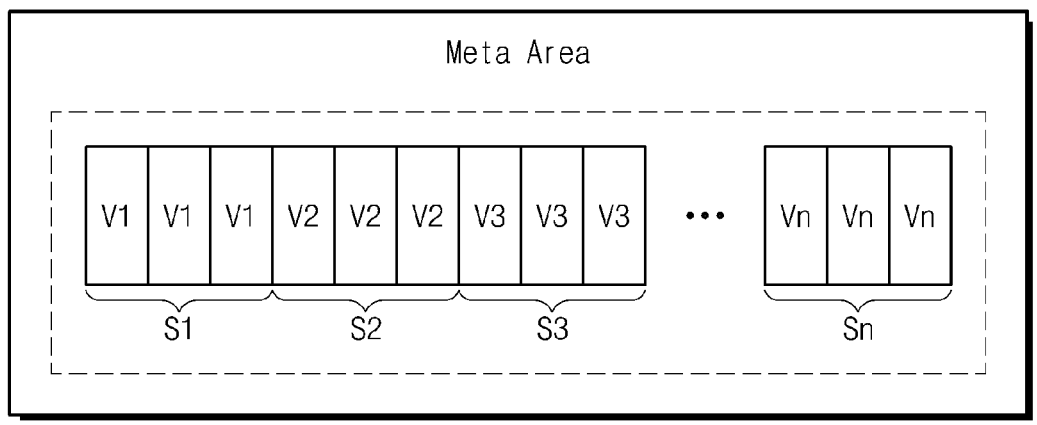
FIG. 11 is a diagram illustrating an exemplary embodiment for securing integrity of data stored in a meta area.
FIG. 12 is a diagram illustrating information recorded at the meta area in FIG. 11.

FIG. 11 is a diagram illustrating an exemplary embodiment for securing integrity of data stored in a meta area. FIG. 12 is a diagram illustrating information recorded in a meta area in FIG. 11.

Referring to FIG. 11, a meta area 417 may include a transfer information area 417a in which information of each sector of read-request data is recorded. Information of each sector may be formed of at least three bits, and the same data on a transfer result of each sector may be written at least three times in duplication. For example, if a first sector S1 is sent to a buffer memory 416, a NVM DMA 113 (refer to FIG. 2) may write "1" at three flags V1 of the transfer information area 417a three times. Thus, although a value of one flag V1 is changed, corresponding data may be safely protected.

For example, referring to FIG. 12, the case that at least two of three flag V have "1" may indicate that a corresponding sector is stored in a buffer memory 116 (refer to FIG. 2). On the other hand, the case that at least two of three flag V have "0" may indicate that a corresponding sector is not stored in the buffer memory 116.

Meta information on a sector transferred to a buffer memory may be stably protected without using of an ECC algorithm, by using a manner in which meta data of a transfer information area is written in duplication.

Figure 13:
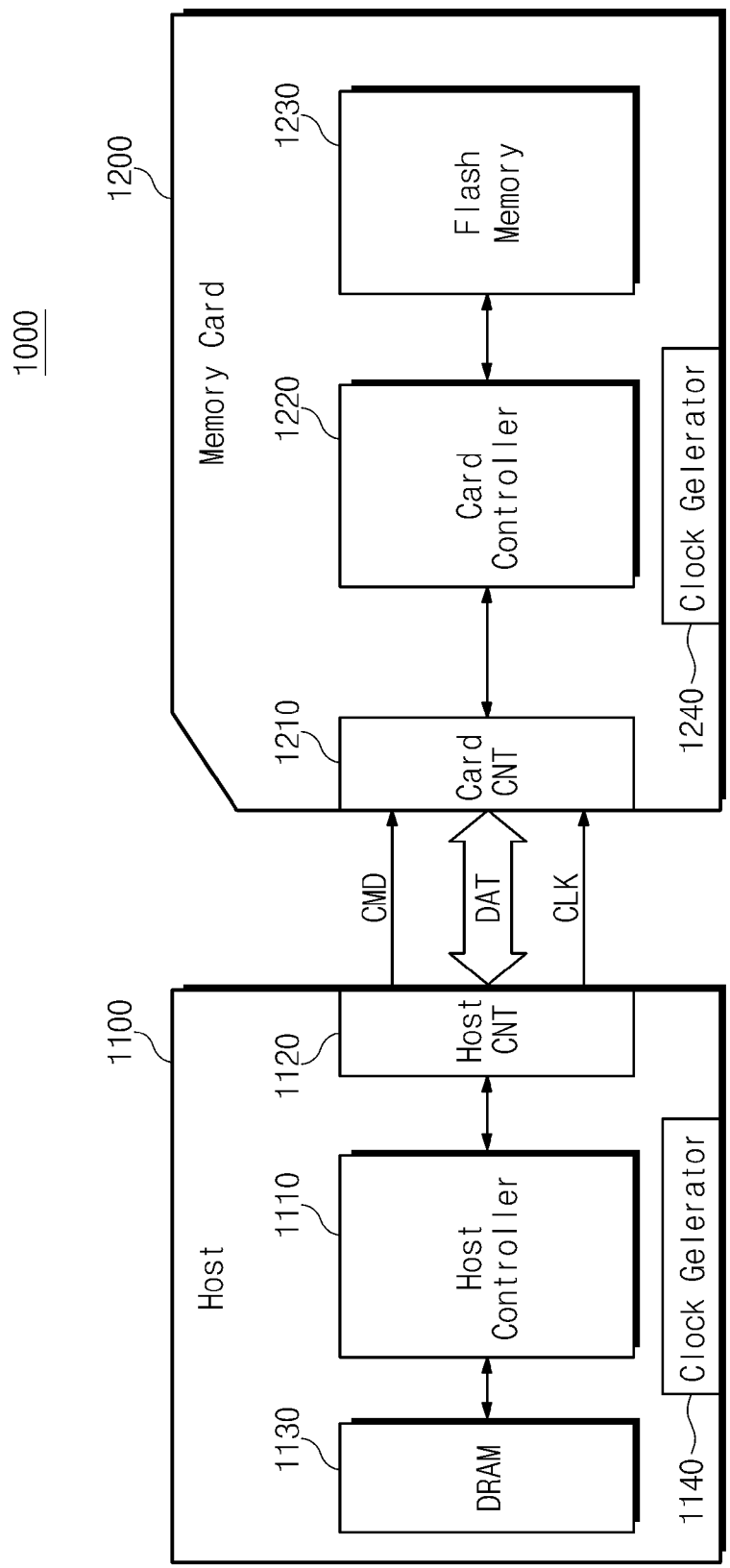
FIG. 13 is a block diagram schematically illustrating a memory card system to which a storage device according to an exemplary embodiment is applied.

FIG. 13 is a block diagram schematically illustrating a memory card system to which a storage device according to an exemplary embodiment is applied. A memory card system 1000 may include a host 1100 and a memory card 1200. The host 1100 may include a host controller 1110, a host connection unit (CNT) 1120, and a DRAM 1130.

The host 1100 may write data in the memory card 1200 and read data from the memory card 1200. The host controller 1110 may send a command CMD (e.g., a write command), a clock signal CLK generated from a clock generator 1140 in the host 1100, and data to the memory card 1200 via the host connection unit 1120. The DRAM 1130 may be a main memory of the host 1100.

The memory card 1200 may include a card connection unit (CNT) 1210, a card controller 1220, and a flash memory 1230. The card controller 1220 may store data in the flash memory 1230 in response to a command input via the card connection unit 1210. The data may be stored in synchronization with a clock signal generated from a clock generator 1240 in the card controller 1220. The flash memory 1230 may store data transferred from the host 1100. For example, in a case where the host 1100 is a digital camera, the flash memory 1230 may store image data.

The memory card system 1000 in FIG. 13 may include a buffer memory and a meta area within the card controller 1220. It is assumed that a read operation on user data is requested from a host. If at least one of sectors of the read-requested data is transferred to the buffer memory, information, indicating that the at least one sector is transferred, may be recorded at the meta area. Thus, an increase in a transfer time due to read latency may be prevented by enabling data to be transferred to a host by a sector unit.

A storage device according to an exemplary embodiment is applicable to a solid state drive/disk (SSD) as well as a memory card. In this case, a controller 110 may be used as an SSD controller, and a NVM device 120 may be used as a storage medium of the SSD.

Figure 14:
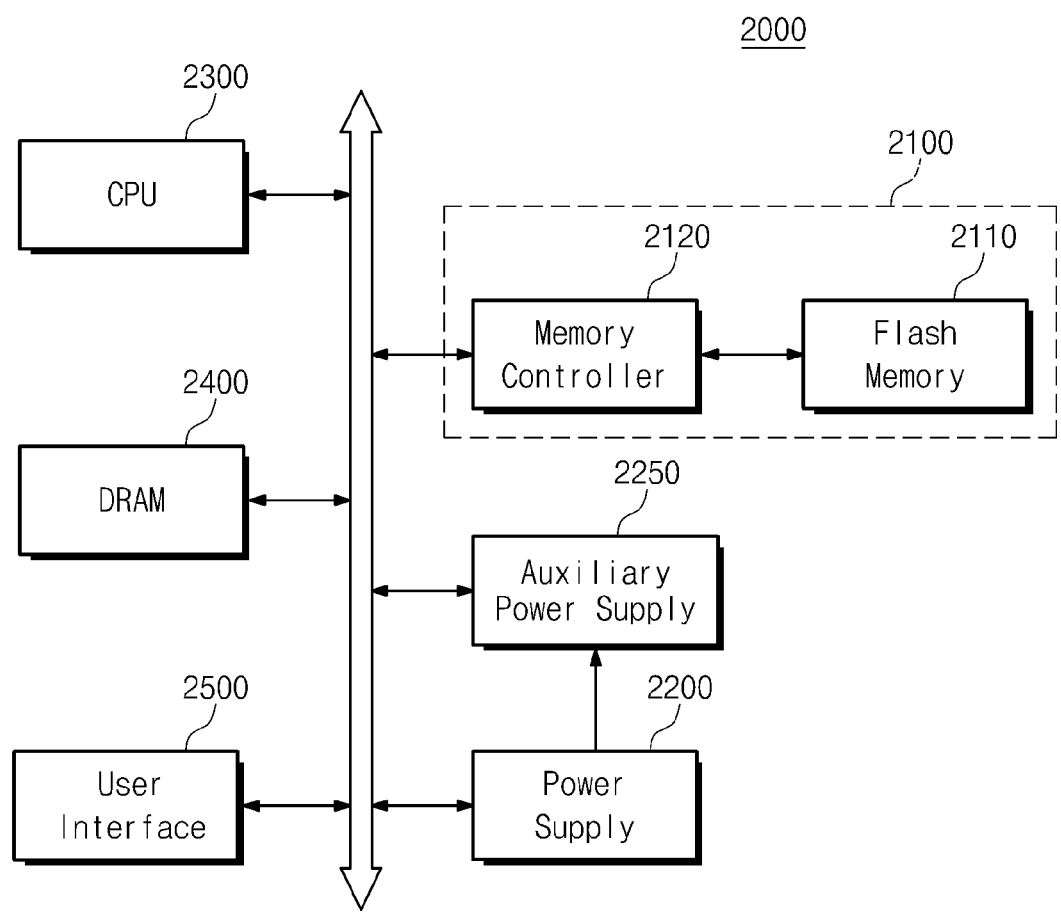
FIG. 14 is a block diagram schematically illustrating an electronic device including a storage device according to an exemplary embodiment.

FIG. 14 is a block diagram schematically illustrating an electronic device including a storage device according to an exemplary embodiment. Herein, an electronic device 2000 may be a personal computer or a handheld electronic device such as a notebook computer, a cellular phone, a PDA, a camera, and the like.

Referring to FIG. 14, the electronic device 2000 may include a storage device 2100, a power supply 2200, an auxiliary power supply 2250, a CPU 2300, a DRAM 2400, and a user interface 2500. The storage device 2100 may include a flash memory 2110 and a memory controller 2120. The storage device 2100 can be embedded within the electronic device 2000.

It is assumed that a read operation on user data is requested from a host. If at least one of sectors of data read-requested by a host is transferred to a buffer memory, the electronic device 2000 may record information, indicating that the at least one sector is transferred, at a meta area. Thus, an increase in a transfer time due to read latency may be prevented by enabling data to be transferred to a host by a sector unit.

A memory system according to an exemplary embodiment is applicable to a flash memory having a three-dimensional structure as well as a flash memory having a two-dimensional structure.

Figure 15:
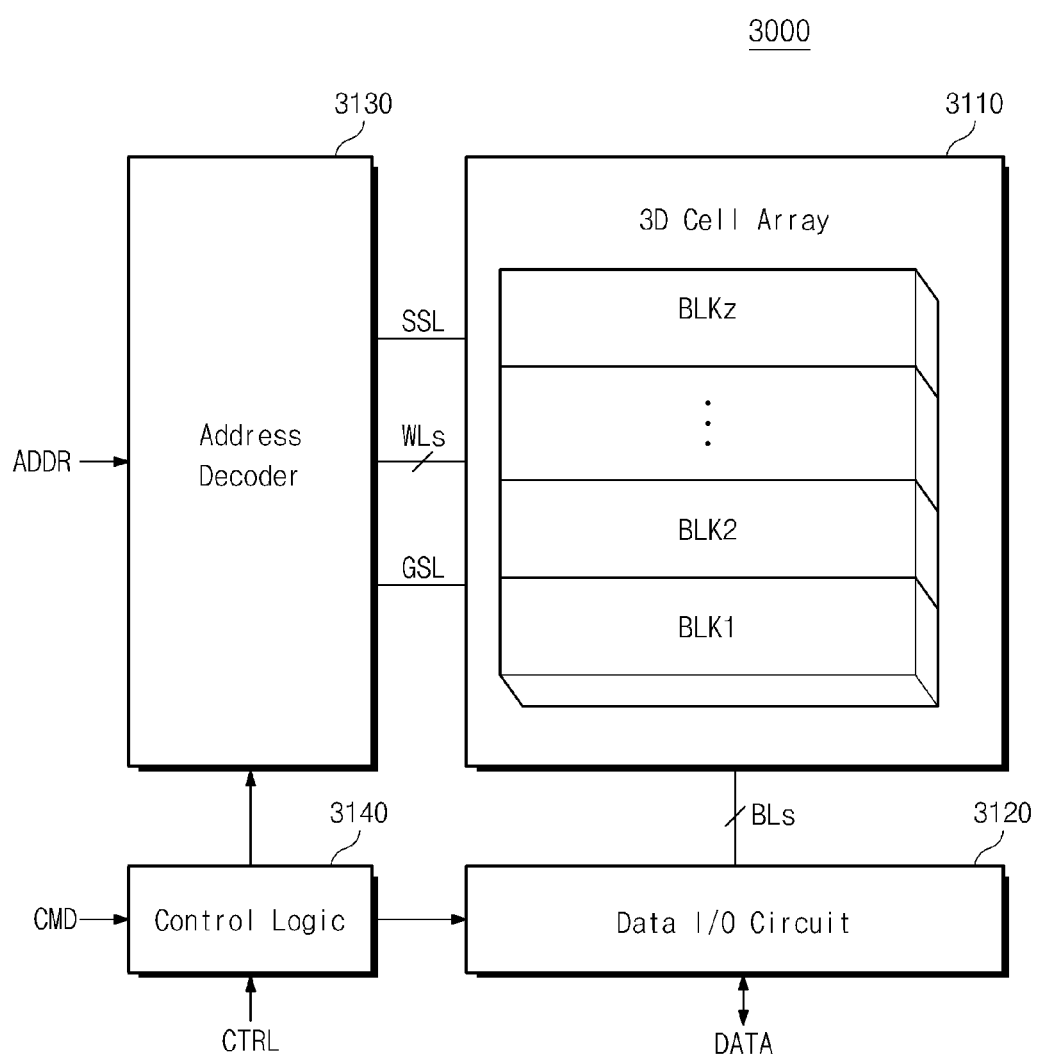
FIG. 15 is a block diagram schematically illustrating a flash memory according to an exemplary embodiment.

FIG. 15 is a block diagram schematically illustrating a flash memory incorporating the inventive concept. Referring to FIG. 15, a flash memory 3000 may include a three-dimensional (3D) cell array 3110, a data input/output (I/O) circuit 3120, an address decoder 3130, and control logic 3140.

The 3D cell array 3110 may include a plurality of memory blocks BLK1 to BLKz, each of which is formed to have a three-dimensional structure (or, a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of the flash memory 3000.

The data I/O circuit 3120 may be connected with the 3D cell array 3110 via a plurality of bit lines BLs. The data I/O circuit 3120 may receive data from an external device or output data read from the 3D cell array 3110 to the external device. The address decoder 3130 may be connected with the 3D cell array 3110 via a plurality of word lines WLs and selection lines GSL and SSL. The address decoder 3130 may select the word lines in response to an address ADDR.

The control logic 3140 may control programming, erasing, reading, etc. of the flash memory 3000. For example, at programming, the control logic 3140 may control the address decoder 3130 such that a program voltage is supplied to a selected word line, and may control the data input/output circuit 3120 such that data is programmed.

Figure 16:
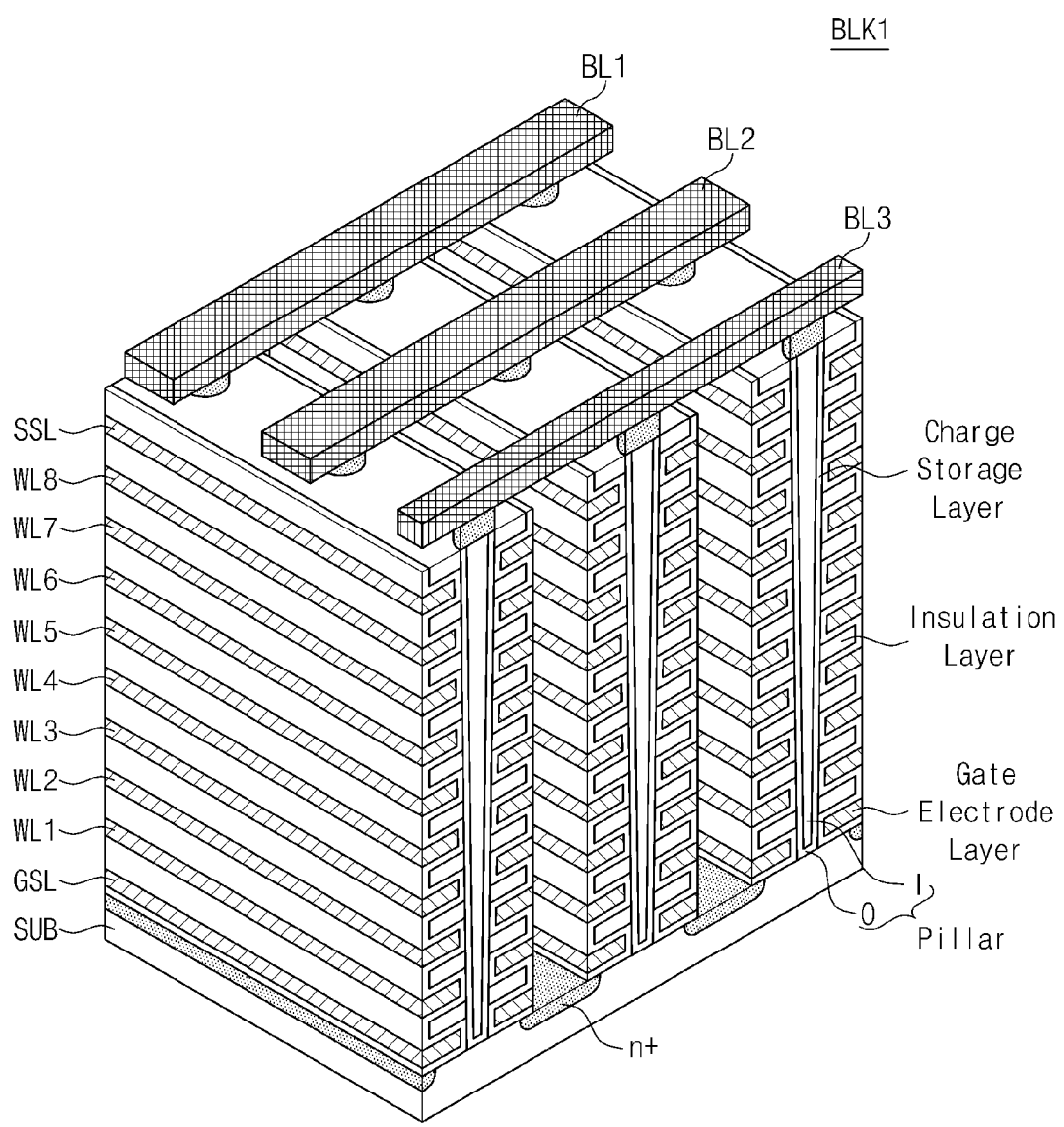
FIG. 16 is a perspective view schematically illustrating a three-dimensional (3D) structure of a memory block illustrated in FIG. 15.

FIG. 16 is a perspective view schematically illustrating a 3D structure of a memory block illustrated in FIG. 15. Referring to FIG. 16, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of word lines WL1 to WL8, and a string selection line SSL. The pillar of the memory block BLK1 may be connected with a plurality of bit lines BL1 to BL3. In FIG. 16, there is illustrated the case that one memory block BLK1 has two selection lines SSL and GSL, eight word lines WL1 to WL8, and three bit lines BL1 to BL3. However, the inventive concept is not limited thereto.

Figure 17:
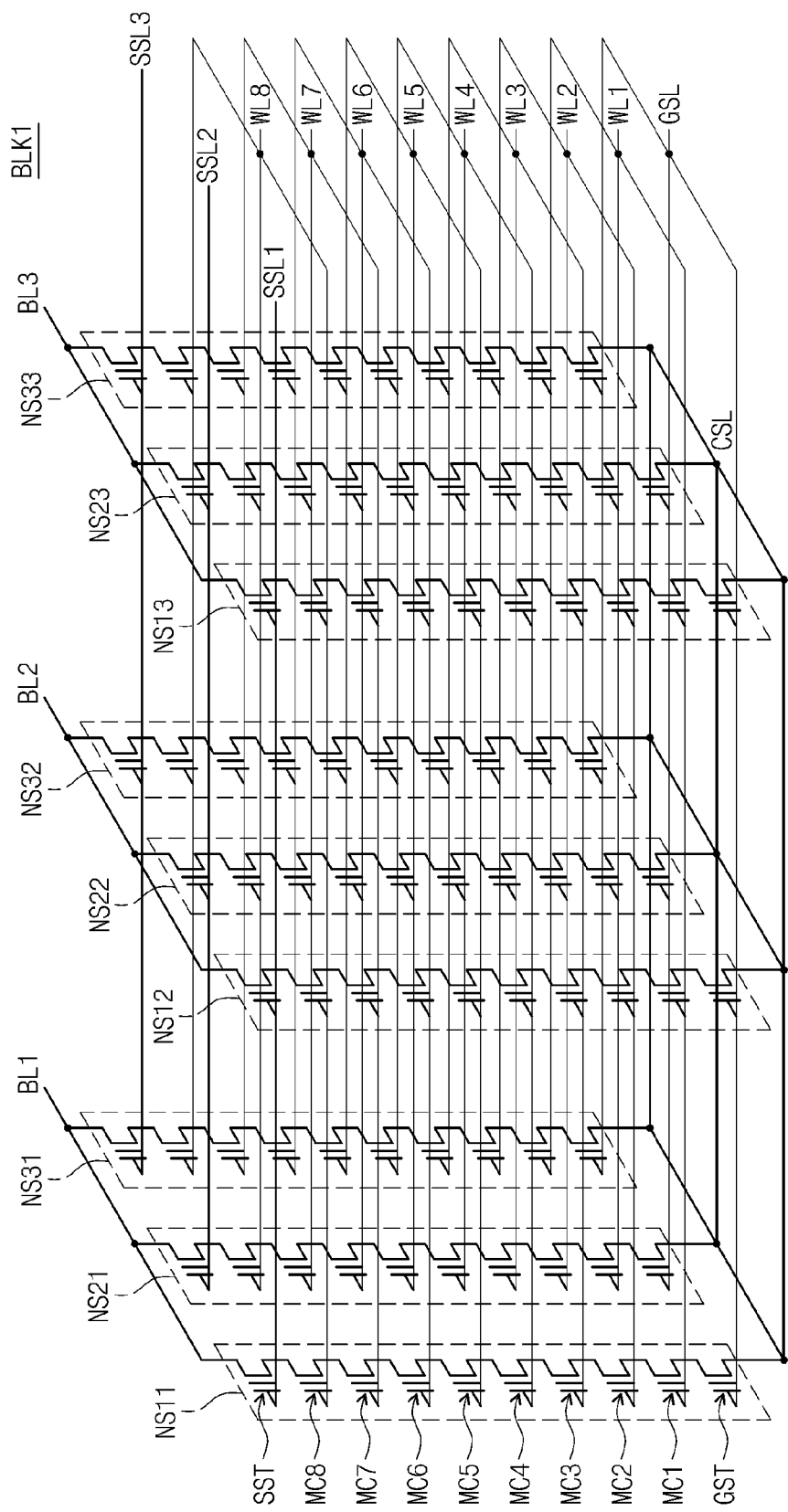
FIG. 17 is a circuit diagram schematically illustrating an equivalent circuit of a memory block illustrated in FIG. 16.

FIG. 17 is a circuit diagram schematically illustrating an equivalent circuit of a memory block illustrated in FIG. 16. Referring to FIG. 17, NAND strings NS11 to NS33 may be connected between bit lines BL1 to BL3 and a common source line CSL. Each NAND string (e.g., NS11) may include a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding word lines WL1 to WL8, respectively. The ground selection transistors GST may be connected with ground selection line GSL. A string selection transistor SST may be connected with a bit line and a ground selection transistor GST may be connected with a common source line CSL.

Word lines (e.g., WL1) having the same height may be connected in common, and the string selection lines SSL1 to SSL3 may be separated from one another. At programming of memory cells (constituting a page) connected with a first word line WL1 and included in NAND strings NS11, NS12, and NS13, there may be selected a first word line WL1 and a first string selection line SSL1.

In FIGS. 1 to 17, exemplary embodiments of the inventive concept are described using a read operation. However, the inventive concept is not limited thereto.

For example, the inventive concept is also applicable to a write operation as well as a read operation. Referring to FIG. 2, in the event that a write operation on user data is requested from a host, a host DMA 116 may write corresponding data in a buffer memory 116, and may record information, indicating whether a transfer of each sector is completed, in a meta area 117. A NVM DMA 113 may confirm data stored in the buffer memory 116 based on information recorded in the meta area 117.

While the inventive concept has been described with reference to exemplary embodiments, it will be apparent to those skilled in the art that various changes and modifications may be made without departing from the spirit and scope of the present inventive concept. Therefore, it should be understood that the above exemplary embodiments are not limiting, but illustrative.

What is claimed is:

1. A storage device comprising:
a nonvolatile memory device configured to store data having a plurality of unit data; and
a controller configured to request the nonvolatile memory device to transfer the data having the plurality of unit data and to write meta information, indicating that a transfer of a unit data among the plurality of unit data from the nonvolatile memory device to a buffer memory is completed, in a meta area of the buffer memory when the unit data among the plurality of unit data is transferred to the buffer memory from the nonvolatile memory device.

2. The storage device of claim 1, wherein after confirming that the unit data is stored in the buffer memory, the controller starts to transmit the unit data to a host.

3. The storage device of claim 2, wherein the controller checks the meta information periodically.

4. The storage device of claim 1, wherein the controller writes the meta information in the buffer memory in duplication.

5. The storage device of claim 1, wherein the controller exchanges data with a host, and the unit data has a size of a sector unit being a data exchange unit between the controller and the host.

6. The storage device of claim 1, wherein when unit data of write-requested data transferred from a host is provided to the buffer memory, the controller writes information, indicating that the unit data of the write-requested data is received, at the buffer memory.

7. A storage device comprising:
a nonvolatile memory device configured to store data having a plurality of unit data;
a buffer memory configured to temporarily store data transferred from the nonvolatile memory device; and
a nonvolatile memory direct memory access (DMA) configured to be in charge of data exchange between the nonvolatile memory device and the buffer memory, to request the nonvolatile memory to transfer the data having the plurality of unit data and when a unit data among the plurality of unit data sent from the nonvolatile memory device is stored in the buffer memory, to write transfer completion information, indicating that the unit data among the plurality of unit data is stored in the buffer memory, in a meta area of the buffer memory.

8. The storage device of claim 7, further comprising:
a host DMA configured to be in charge of data exchange between the buffer memory and a host, the host DMA checking the transfer completion information recorded in the meta area of the buffer memory periodically.

9. The storage device of claim 8, wherein the host DMA confirms that at least one unit data is stored in the buffer memory, based on the transfer completion information recorded in the meta area, and then starts to send the at least one unit data stored in the buffer memory to the host.

10. The storage device of claim 8, wherein the unit data has a size of a sector unit being a data exchange unit between the host DMA and the host.

11. The storage device of claim 10, wherein the host DMA stores write-requested data from the host at the buffer memory, and writes information, indicating that data of the sector unit is stored in the buffer memory, in the meta area whenever the write-requested data is stored in the buffer memory by the sector unit.

12. The storage device of claim 8, further comprising:
a central processing unit (CPU) configured to control an overall operation of the storage device,
wherein at a read operation or a write operation, an authority associated with data exchange is provided to the host DMA and the nonvolatile memory DMA from the CPU.

13. The storage device of claim 7, further comprising:
an error correction code (ECC) circuit configured to correct an error of data transferred to the buffer memory from the nonvolatile memory device,
wherein the nonvolatile memory DMA writes the transfer completion information in the meta area based on an error correction result of the ECC circuit.

14. The storage device of claim 13, wherein the ECC circuit performs an error correction operation by an error correction unit corresponding to an integer multiple of a size of the unit data, and the nonvolatile memory DMA writes the transfer completion information in the meta area whenever data corresponding to the error correction unit is stored in the buffer memory.

15. The storage device of claim 7, wherein the nonvolatile memory DMA writes the transfer completion information in the meta area in duplication.

16. A storage device comprising:
a nonvolatile memory device configured to store data having a plurality of unit data; and
a controller comprising a buffer memory and a meta area and configured to request the nonvolatile memory device to transfer the data having the plurality of unit data, the buffer memory configured to temporarily store unit data from the nonvolatile memory device and the meta area configured to store meta information corresponding to the unit data,
wherein when a transfer of the unit data among the plurality of unit data from the nonvolatile memory to the buffer memory is completed, the controller writes the meta information that indicates that a transfer of the unit data among the plurality of unit data from the nonvolatile memory to the buffer memory is completed.

17. The storage device according to claim 16, wherein:
the controller receives a read request to read unit data from the nonvolatile memory, and in response to the read request, checks the meta information stored in the meta area and transfers the unit data according to the meta information.

18. The storage device according to claim 16, wherein, if the meta information indicates that the requested data is stored in the buffer memory, the controller transfers the unit data from the buffer memory.

19. The storage device according to claim 16, wherein the buffer memory includes the meta area.

* * * * *